UNITED STATES PATENT OFFICE.

ERWIN HAGEN, OF ST. LOUIS, MISSOURI.

PRESERVING WOOD.

SPECIFICATION forming part of Letters Patent No. 246,762, dated September 6, 1881.

Application filed January 15, 1881. (No specimens.)

*To all whom it may concern:*

Be it known that I, ERWIN HAGEN, a citizen of the United States, residing in the city of St. Louis, in the State of Missouri, have invented a new and useful process of impregnating wood by an antiseptic solution, thereby preserving the same against all influences of the atmosphere or dampness, while its power of resistance is not diminished, but rather increased.

My process materially consists of the following operations, to wit: First, I submit the logs, timber, or other pieces of wood, of any variety or shape, to the direct influence of steam and heat, or either of the said mediums, in order to remove all soluble vegetable parts from the pores or grains, leaving a spongy skeleton of wooden fiber. In this state the timber is ready to receive the antiseptic solution. I now bring my timber into a boiler, in which I introduce the solution. This consists of the solution of chloride of zinc in water, the antiseptic action of which salt is now well known, and has been for a long time, as shown in the burnettizing process. In this solution I dissolve one per centum (more or less) of sulphate of lime, which in trade is generally known as "gypsum" or "plaster-of-paris," or which I may precipitate from a solution of lime. This salt will readily dissolve in the above-mentioned solution of zinc, forming a perfectly fluid compound. Having thus prepared my impregnating medium, I fill the boiler containing the wood, and then I apply a pressure of eighty-five to one hundred pounds to the inch, which pressure may be hydraulic or pressure of steam or otherwise. Under this pressure the fluid enters into all the pores and channels of the wood, filling the same, and now the fibers absorb the water of the solution, concentrating the solution sufficiently to create a general process of crystallization within the timber. The sulphate of lime, crystallizing, hardens and forms the partitions, holding the chloride of zinc (a very soluble salt) within the cells, protected against the influence of decomposition or solution by outside mediums, such as water or air.

I am well aware that chloride of zinc has been used for similar purposes heretofore, either alone or in combination with other mediums, such as tannin, gelatine, &c.

The proportions in which I generally use the ingredients in my preserving liquid are as follows: sulphate of lime, one per centum; chloride of zinc, two per centum; water, ninety-seven per centum, in one hundred parts of the liquid, this always forming a perfect solution of gypsum in the chloride of zinc in the stated proportions.

What I claim as my invention, and desire to secure by Letters Patent of the United States, is—

A solution consisting of water, chloride of zinc, and sulphate of lime, in the proportions and for the purpose substantially as described.

Witness my hand hereon.

ERWIN HAGEN.

Witnesses:
 N. M. HARRIS,
 E. F. SCHREINER,
 JNO. A. GERHAEUSSER.